(12) United States Patent (10) Patent No.: US 8,199,783 B2
Hosokawa (45) Date of Patent: Jun. 12, 2012

(54) METHOD AND DEVICE FOR TRANSMITTING SIGNAL BETWEEN DEVICES

(75) Inventor: Kouhei Hosokawa, Tokyo (JP)

(73) Assignee: NEC Corporation, Tokyo (JP)

( * ) Notice: Subject to any disclaimer, the term of this patent is extended or adjusted under 35 U.S.C. 154(b) by 437 days.

(21) Appl. No.: 11/921,269

(22) PCT Filed: May 23, 2006

(86) PCT No.: PCT/JP2006/310621
§ 371 (c)(1),
(2), (4) Date: Nov. 29, 2007

(87) PCT Pub. No.: WO2006/129579
PCT Pub. Date: Dec. 7, 2006

(65) Prior Publication Data
US 2009/0290594 A1 Nov. 26, 2009

(30) Foreign Application Priority Data
May 31, 2005 (JP) .................... 2005-158268

(51) Int. Cl.
*H04J 99/00* (2009.01)
*G06F 3/00* (2006.01)
(52) U.S. Cl. .................... 370/546; 370/389; 370/412
(58) Field of Classification Search .......... 370/389, 370/419, 546; 703/14
See application file for complete search history.

(56) References Cited

U.S. PATENT DOCUMENTS

| | | | |
|---|---|---|---|
| 4,930,103 | A | 5/1990 | Geiger et al. |
| 5,031,095 | A | 7/1991 | Hara et al. |
| 5,748,911 | A | 5/1998 | Maguire et al. |
| 6,195,397 | B1 * | 2/2001 | Kwon ............. 375/288 |
| 7,228,513 | B2 | 6/2007 | Hosokawa |
| 7,395,197 | B2 * | 7/2008 | Nakamura ............. 703/17 |
| 2005/0055190 | A1 * | 3/2005 | Hosokawa ............. 703/14 |
| 2006/0062234 | A1 * | 3/2006 | Tsubamoto ............. 370/419 |

FOREIGN PATENT DOCUMENTS

| | | |
|---|---|---|
| JP | 4-137200 | 5/1992 |
| JP | 11-027328 | 1/1999 |
| JP | 11-073440 | 3/1999 |
| JP | 2005-084957 A | 3/2005 |

OTHER PUBLICATIONS

Begley, Terry Slides on "Physical Layer Propogation from Panko's Business Data Networks and Telecommunications, 4th edition" p. 8, Apr. 2003.*
J. Babb et al., "Virtual Wires: Overcoming Pin Limitations in FPGA-based Logic Emulators," Proc. IEEE Workshop on FPGA-based Custom Computing Machines, Apr. 1993, pp. 142-151.

* cited by examiner

*Primary Examiner* — Dang Ton
*Assistant Examiner* — Robert M Morlan
(74) *Attorney, Agent, or Firm* — Foley & Lardner LLP

(57) ABSTRACT

The transmission side device 10 is provided with a memory $M_T$ for holding a plurality of transmission signals transmitted last time and the reception side device 20 is provided with a memory $M_R$ for holding a plurality of reception signals received last time, thereby checking existence/non-existence of a change of a transmission signal to be transmitted this time by a comparator C. The transmission unit 103 transmits the changed part signal $S_L$ for discriminating a changed signal and the change end signal $S_E$. The reception side device 20 equivalently receives a transmission signal as of this time by detecting and changing a changed signal among signals held in the memory $M_R$ based on the changed part signal $S_L$. The clock generation unit 30 changes the circuit operation clock $CLK_C$ to advance the transmission circuit 101 and the reception circuit 201 by one cycle by receiving the change end signal $S_E$. This enables data transmission/reception between devices to be sped up, as well as enabling high-speed operation of the entire system.

18 Claims, 9 Drawing Sheets

METHOD AND DEVICE FOR TRANSMITTING SIGNAL BETWEEN DEVICES

TECHNICAL FIELD

The present invention relates to a technique for transmitting a signal between devices and, more particularly, to a method and a device for transmitting and receiving data at a high speed in a circuit in which the number of signals to be transmitted exceeds the number of physical pins of a device.

BACKGROUND ART

Recent advances in semiconductor technology have been improving the integration level of logical LSI year by year, which makes a problem graver that the number of physical pins of a device falls short of a necessary number of signals. Most common method of eliminating such a shortage of the number of pins is multiplexing and transferring a plurality of pieces of data into one signal line on a time-division basis by using parallel-serial conversion (see e.g. Literature 1). In this case, a clock frequency for data transfer should be set to be higher than an operation clock of a device according to the number of signals to be multiplexed.

Literature 1: J. Babb, R. Tessier, and A. Agarwal, "Virtual Wires: Overcoming Pin Limitations in FPGA-based Logic Emulators", in Proc. IEEE Workshop on FPGA-based Custom Computing Machines, Napa, Calif., April 1993, pp. 142-151.

Disclosed in Japanese Patent Laying-Open No. 11-73440 (Literature 2) is an emulation device which executes transmission and reception between devices with a signal to be multiplexed on a time-division basis and other signal appropriately mixed in view of a problem that an operating frequency of a circuit will be relatively decreased in signal transfer when simply using parallel-serial conversion.

The basic idea of the above-described related art is to enable transmission and reception of more signals than the number of physical connections between devices by virtually increasing the number of signal lines between the devices by time-division multiplexing. A dividing ratio of a clock for circuit operation to a clock for data transfer is determined only by the number of signals to be multiplexed to the pin and once a data transfer clock frequency is determined, speed-up of the operation of the entire system is impossible.

In addition, because a plurality of signals are multiplexed on a time-division basis to a physical connection between the devices, a time slot will be resultantly assigned to each signal irrespectively of existence/non-existence of a signal, which leaves a room for improvement in view of effective use of such a resource as a physical signal line.

SUMMARY

Under these circumstances, the inventor of the present invention obtains a basis idea of transmitting only data having a change in view of the fact that a value of data to be transmitted or received is not always changed. Using the idea enables a circuit to be operated at a higher speed. Furthermore, transmitting only data having a change enables more effective use of a physical signal line.

According to a first aspect of the invention, a signal transmission device for transmitting a plurality of signals between a plurality of circuits operable according to given operation timing through a connection unit, includes a transmission side storage unit connected to a transmission side circuit for holding each value of the plurality of signals transmitted at one-preceding operation timing, a reception side storage unit connected to a reception side circuit for holding each value of the plurality of signals received at the one-preceding operation timing, a determination unit for determining whether each value of the plurality of signals transmitted from the transmission side circuit at current operation timing is changed from a value held in the transmission side storage unit, a transmission unit for generating transmission information including first information for discriminating a changed signal and second information indicative of the end of change discrimination at current operation timing based on a determination result of the determination unit and transmitting the generated information to the connection unit, a reception unit for receiving input of the first information through the connection unit to discriminate a changed signal among the plurality of signals, a change unit for changing a value corresponding to the changed signal which is held in the reception side storage unit to output the obtained value as a reception signal of current operation timing to the reception side circuit, and a timing control unit for receiving the second information to control the operation timing.

According to a second aspect of the invention, a signal transmission method of transmitting a plurality of signals between a plurality of circuits operable according to given operation timing through a connection unit, includes holding each value of the plurality of signals transmitted at one-preceding operation timing on the transmission side and the reception side, determining whether each value of the plurality of signals transmitted at current operation timing is changed from a value held on the transmission side, generating transmission information including first information for discriminating a changed signal and second information indicative of end of change discrimination at current operation timing based on the determination result, transmitting the transmission information to the reception side, discriminating a changed signal among the plurality of signals based on the first information received through the connection unit, changing, with respect to the changed signal, a corresponding value which is held on the reception side to receive the obtained signal as a reception signal of current operation timing, and receiving the second information to change the operation timing and apply the obtained timing to the plurality of circuits.

According to the present invention, since data transmitted or received last time is held in the storage unit and only changed data is transmitted or received, time required for transmission and reception between devices can be reduced. More effects can be obtained when a signal to be transmitted or received changes little.

The timing control unit is allowed to generate operation timing without loss by changing the number of cycles necessary for transmission and reception upon reception of a change end signal or the second information. More specifically, while in the related transfer systems, with a clock frequency fixed by the multiplexing level and even when no signal changes, the clock frequency always remains the same to disable high-speed operation, the present invention enables a circuit to operate at a higher speed than that of the related methods.

10, 20: device, 30: clock generation unit, 40: oscillator, 101: transmission circuit, 102: transmission module, 103: transmission unit (encoder), 201: reception circuit, 202: reception module, 203: reception unit (decoder), $S_1 \sim S_N$: transmission signal, $M_{T1} \sim M_{TN}$: memory on transmission side, $DFF_{T1} \sim DFF_{T4}$: D flip-flop circuit on transmission side, $C_1 \sim C_N$: comparator, $M_{R1} \sim M_{RN}$: memory on reception side, $DFF_{R1} \sim DFF_{R4}$: D flip-flop circuit on reception side, $D_1 \sim D_N$: change detector, $S_1' \sim S_N'$: reception signal, $CLK_D$: data transfer clock, $CLK_C$: circuit operation clock.

Exemplary Embodiment

1. Schematic Structure of System

Figure 1:
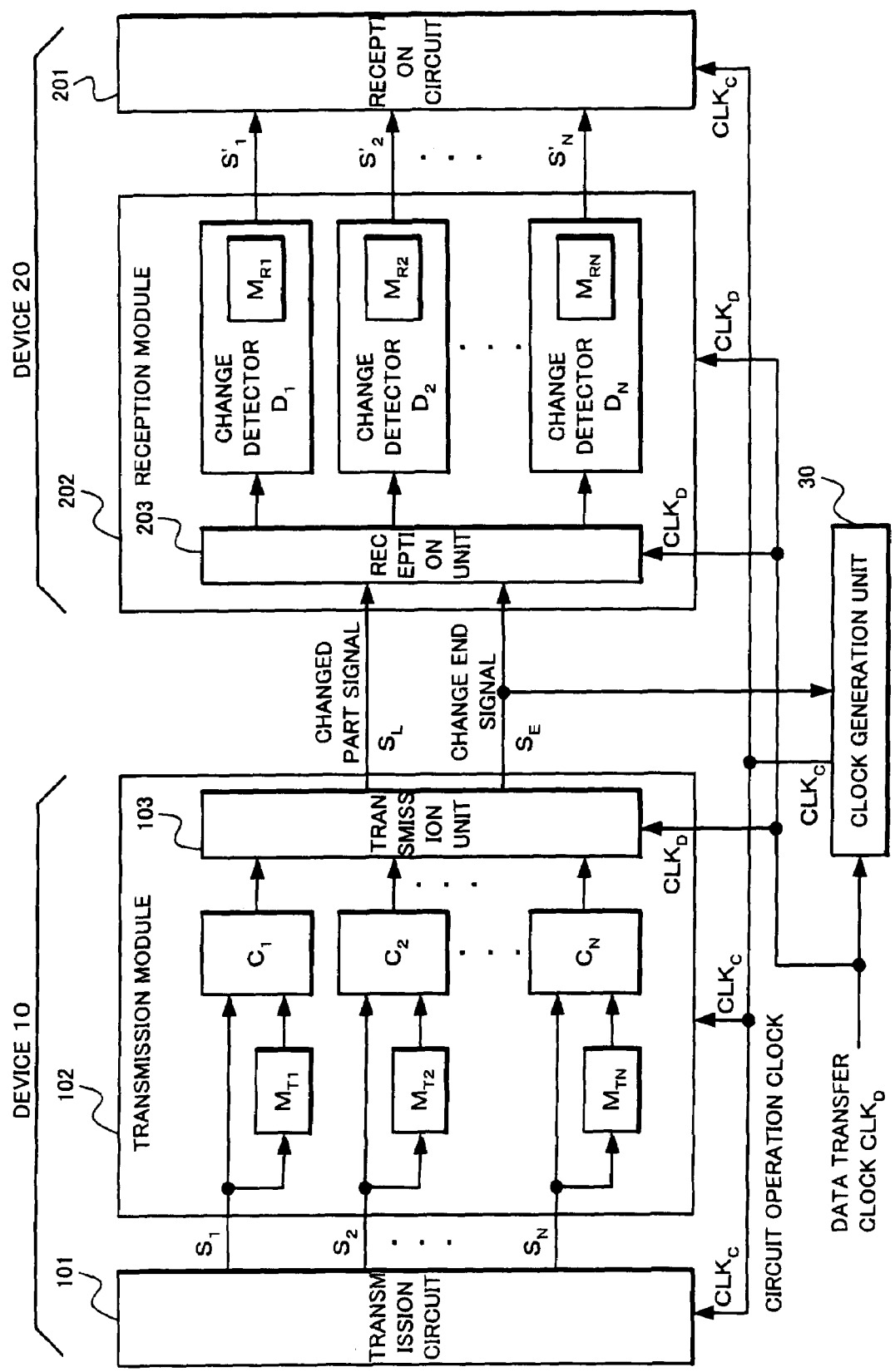
FIG. 1 is a block diagram showing a schematic structure of a signal transmission device according to one exemplary embodiment of the present invention.

FIG. 1 is a block diagram showing a schematic structure of a signal transmission device according to one exemplary embodiment of the present invention. For preventing complication of the figure, description will be here made of a case where a number N (N is an integer not less than 2) of signals $S_1 \sim S_N$ are transmitted from a device 10 to a device 20 as an example.

The device 10 on the transmission side is provided with a transmission circuit 101 and a transmission module 102. The transmission signals $S_1 \sim S_N$ output from the transmission circuit 101 are converted into transmission information formed of a changed part signal $S_L$ and a change end signal $S_E$ by the transmission module 102 and transmitted to the device 20. The device 20 is provided with a reception circuit 201 and a reception module 202, in which the reception module 202 receives transmission information formed of the changed part signal $S_L$ and the change end signal $S_E$ to detect a changed transmission signal, thereby outputting reception signals $S_1' \sim S_N'$ corresponding to the transmission signals $S_1 \sim S_N$, respectively, to the reception circuit 201.

Transmission and reception of the changed part signal $S_L$ and the change end signal $S_E$ and change detection operation by the reception module 202 are executed in synchronization with a data transfer clock $CLK_D$. Operation of the transmission circuit 101, the transmission module 102 and the reception circuit 201 is executed in synchronization with a circuit operation clock $CLK_C$. The circuit operation clock $CLK_C$ is a clock for determining an operation cycle of a circuit, which is generated by a clock generation unit 30 by using output timing of the change end signal $S_E$ as will be described later.

1. 1) Transmission Module

The transmission module 102 is provided with a number N of change determination units corresponding to the transmission signals $S_1 \sim S_N$, respectively, and a transmission unit 103. Each of the number N of change determination units is formed of a memory $M_{Ti}$ and a comparator $C_i$ (i is any one of integers 1~N). In the memory $M_{Ti}$, a value of the transmission signal $S_i$ in one-preceding operation cycle (a predetermined value at the time of start-up) is stored. Accordingly, by comparing a current value input from the transmission circuit 101 and a one-preceding value stored in the memory $M_{Ti}$, the comparator $C_i$ is allowed to determine whether the relevant transmission signal $S_i$ has a change. The comparator $C_i$ is assumed to output a logical value "1" to the transmission unit 103 when the signal has a change and output a logical value "0" unless otherwise.

The transmission unit 103 receives input of the number N of comparison results 1/0 from the number N of comparators $C_1 \sim C_N$, generates a value assigned in advance according to the pattern of "1" as the changed part signal $S_L$ or the change end signal $S_E$ and transmits the same to the device 20 in synchronization with the data transfer clock $CLK_D$.

1. 2) Changed Part/Change End Signal

The changed part signal $S_L$ is a signal for discriminating which of the transmission signals $S_1 \sim S_N$ has been changed and has a minimum number of bits necessary for representing an integer N in binary. The change end signal $S_E$ is a signal indicating that change of the transmission signals $S_1 \sim S_N$ has been all completed (including no change) in each cycle and is a signal with at least one bit indicative of validity/invalidity of the changed part signal $S_L$. Timing at which the change end signal $S_E$ is output is accordingly advanced or delayed according to the number of transmission signals changed. In a case where all the transmission signals are changed, for example, the change end signal $S_E$ is output at timing corresponding to a time interval of an original cycle and in a case of no change, the change end signal $S_E$ is output in a shortest time (one cycle of the data transfer clock $CLK_D$ here). The circuit operation clock $CLK_C$ is generated by using the change end signal $S_E$.

While the change end signal $S_E$ may be transmitted through other signal line than that of the changed part signal $S_L$, when the changed part signal $S_L$ having a minimum number of bits necessary for representing an integer N in binary has a free space (e.g. in a case where five signals are discriminated by three bits), assigning the bit to the change end signal $S_E$ enables all the necessary information to be transmitted by one signal line. When the changed part signal $S_L$ has no free space such as a case where the number of signals to be multiplexed is the second power (such a case where eight signals are discriminated by three bits), one bit needs to be separately assigned to the change end signal $S_E$.

1. 3) Reception Module

The reception module 202 is provided with a reception unit 203 and a number N of change detectors $D_1 \sim D_N$ corresponding to the reception signals $S_1' \sim S_N'$, respectively. The reception unit 203 specifies a changed signal based on a value of a received changed part signal $S_L$ and notifies a corresponding change detector of a change. The reception unit 203 should be set to ignore the change end signal $S_E$ at its reception.

Each change detector $D_i$ is provided with a memory $M_{Ri}$ and changes a value stored in a relevant memory $M_{Ri}$ when notified of a change by the reception unit 203. Thus, the reception signals $S_1'\sim S_N'$ updated in each cycle are stored in the memories $M_{R1}\sim M_{RN}$. The reception circuit 201 is accordingly allowed to receive input of a decoded signal of the transmission signals $S_1\sim S_N$ by reading data from the memories $M_{R1}\sim M_{RN}$ according to the circuit operation clock $CLK_C$.

1. 4) Clock Generation

The clock generation unit 30 generates the circuit operation clock $CLK_C$ synchronizing with the data transfer clock $CLK_D$ according to the output timing of the change end signal $S_E$. The clock generation unit 30 generates a circuit operation clock $CLK_C$ so as to advance the operation cycle of the transmission circuit 101 and the reception circuit 201 by one at the output timing of the change end signal $S_E$, whose specific example will be described later. As described above, because timing at which the change end signal $S_E$ is output changes with the number of transmission signals changed, generating the circuit operation clock $CLK_C$ by using the change end signal $S_E$ enables operation of the entire system to be sped up as will be described later.

First Exemplary Embodiment 2. 1) Device Structure

Figure 2:
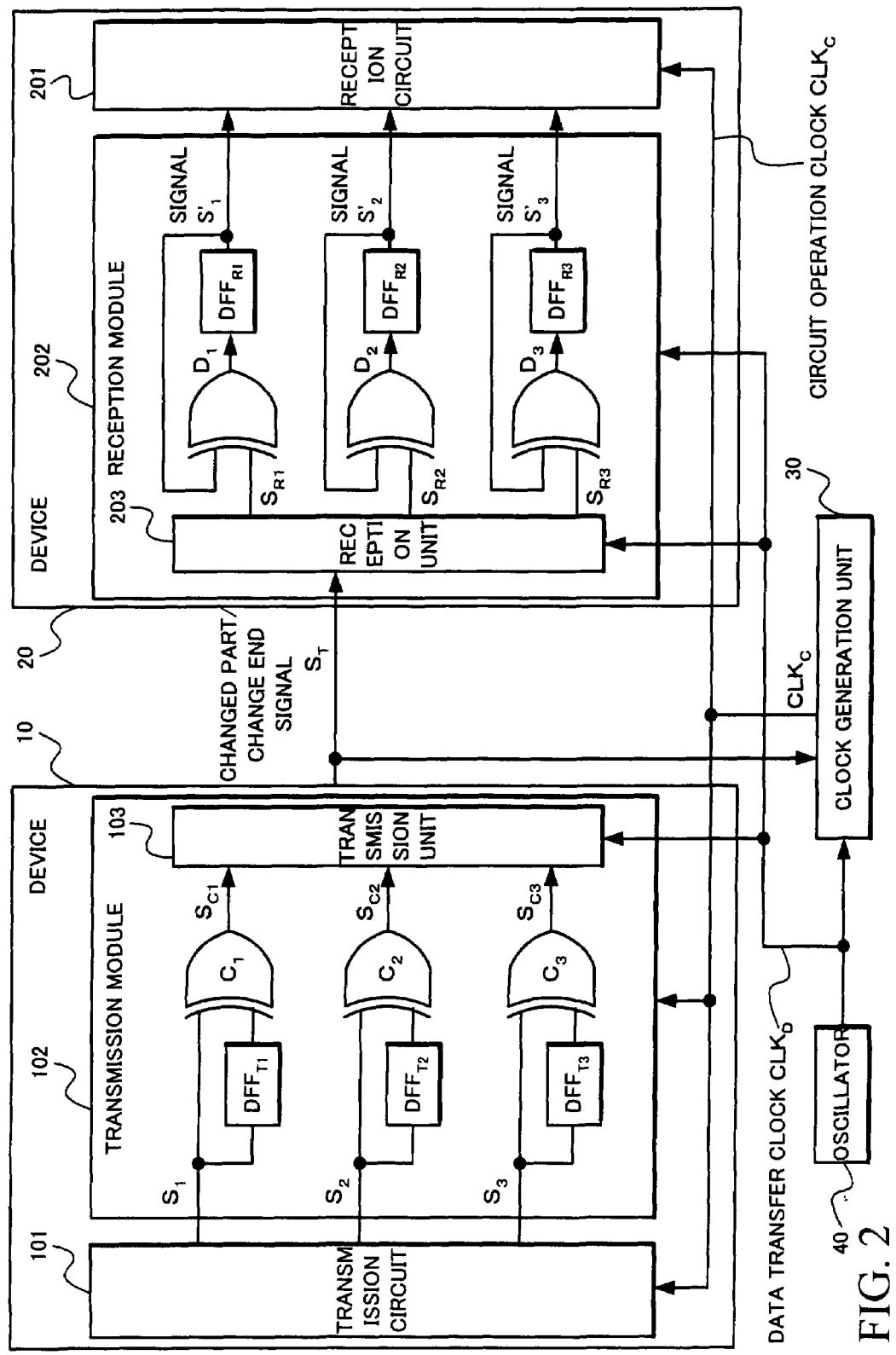
FIG. 2 is a block diagram showing a structure of a signal transmission device according to a first exemplary embodiment of the present invention.

FIG. 2 is a block diagram showing a structure of a signal transmission device according to a first exemplary embodiment of the present invention. In the present exemplary embodiment, description will be made of a case where three signals $S_1\sim S_3$ are transmitted from the device 10 to the device 20 as one example. Block having the same function as that of the circuit shown in FIG. 1 will be given the same reference numeral to appropriately omit its description.

The device 10 on the transmission side is provided with the transmission circuit 101 and the transmission module 102. The transmission signals $S_1\sim S_3$ output from the transmission circuit 101 are converted into transmission information $S_T$ formed of the changed part signal $S_L$ and the change end signal $S_E$ by the transmission module 102 and transmitted to the device 20 on the reception side. The device 20 on the reception side is provided with the reception circuit 201 and the reception module 202, in which the reception module 202 receives the transmission information $S_T$ formed of the changed part signal $S_L$ and the change end signal $S_E$ to detect a changed transmission signal, thereby outputting the reception signals $S_1'\sim S_3'$ corresponding to the transmission signals $S_1\sim S_3$ to the reception circuit 201.

Transmission and reception of the changed part signal $S_L$ and the change end signal $S_E$ and change detection operation of the reception module 202 are executed in synchronization with the data transfer clock $CLK_D$. Operation of the transmission circuit 101, the transmission module 102 and the reception circuit 201 is executed in synchronization with the circuit operation clock $CLK_C$. The data transfer clock $CLK_D$ is generated by an oscillator 40. The clock generation unit 30 generates the data transfer clock $CLK_D$ by controlling the circuit operation clock $CLK_C$ according to output timing of the change end signal $S_E$.

The transmission module 102 is provided with three change determination units corresponding to the transmission signals $S_1\sim S_3$ and the transmission unit 103. Each of the three change determination units is formed of a D flip-flop circuit $DFF_{Ti}$ and an exclusive OR (EXOR) circuit $C_i$ (i is any one of integers 1~3). In the D flip-flop circuit $DFF_{Ti}$, a value of the transmission signal $S_i$ in one-preceding operation cycle (the predetermined value "0" at the time of start-up) is stored. Accordingly, when a current value input from the transmission circuit 101 and a one-preceding value stored in the D flip-flop circuit $DFF_{Ti}$ are different (i.e. with a change), the exclusive OR circuit $C_i$ outputs a determination signal $S_{Ci}$ with the logical value "1" to the transmission unit 103 and when they coincide with each other (i.e. with no change), outputs the determination signal $S_{Ci}$ with the logical value "0" to the transmission unit 103.

The transmission unit 103 has an encoding function. The unit receives input of each of the three determination signals $S_{C1}\sim S_{C3}$ from the exclusive OR circuits $C_1\sim C_3$ and converts the same into a value assigned in advance according to which determination signal has the logical value "1". Thus obtained value is transmitted as the changed part signal $S_L$ or the change end signal $S_E$ to the device 20 in synchronization with the data transfer clock $CLK_D$. In the present exemplary embodiment, since a minimum number of bits necessary for representing the number 3 of signals in binary is two, the changed part signal $S_L$ has one free space, to which the change end signal $S_E$ is assigned as will be described later.

The reception module 202 is provided with the reception unit 203, and exclusive OR circuits $D_1\sim D_3$ and D flip-flop circuits $DFF_{R1}\sim DFF_{R3}$ corresponding to the reception signals $S_1'\sim S_3'$, respectively.

The reception unit 203 has a decoding function corresponding to the encoding function of the transmission unit 103 and discriminates a changed signal based on a value of a received changed part signal $S_L$. Then, among inversion signals $S_{R1}\sim S_{R3}$ for inverting the DFF, the unit brings an inversion signal $S_R$ corresponding to a changed signal to be active. The inversion signals $S_{R1}\sim S_{R3}$ are input to the exclusive OR circuits $D_1\sim D_3$, respectively. The exclusive OR circuits $D_1\sim D_3$ further receive input of one-preceding reception signals $S_1'\sim S_3'$ from the D flip-flop circuits $DFF_{R1}\sim DFF_{R3}$ to detect coincidence/lack of coincidence between the signals $S_{R1}\sim S_{R3}$ indicative of a current change and the one-preceding reception signals $S_1'\sim S_3'$. Therefore, when the signal $S_{Ri}$ indicative of a change is active ("1"), a value stored in the corresponding D flip-flop circuit $DFF_{Ri}$ is inverted and when the same is inactive ("0"), the value stored in the corresponding D flip-flop circuit $DFF_{Ri}$ is held unchanged.

Thus, only the signal $S_i'$ specified by the value of the changed part signal $S_L$ is changed and the remaining signals are held unchanged from a state in a preceding cycle. The reception circuit 201 is therefore allowed to receive input of decoded signals of the transmission signals $S_1\sim S_3$ by reading data from the D flip-flop circuits $DFF_{R1}\sim DFF_{R3}$ according to the circuit operation clock $CLK_C$.

The clock generation unit 30 has a function of detecting the change end signal $S_E$ and generates the circuit operation clock $CLK_C$ so as to advance operation cycles of the transmission circuit 101 and the reception circuit 201 by one according to that detection timing (whose details will be described later).

2. 2) Encoder of Transmission Unit

Figures 3A, 3B:
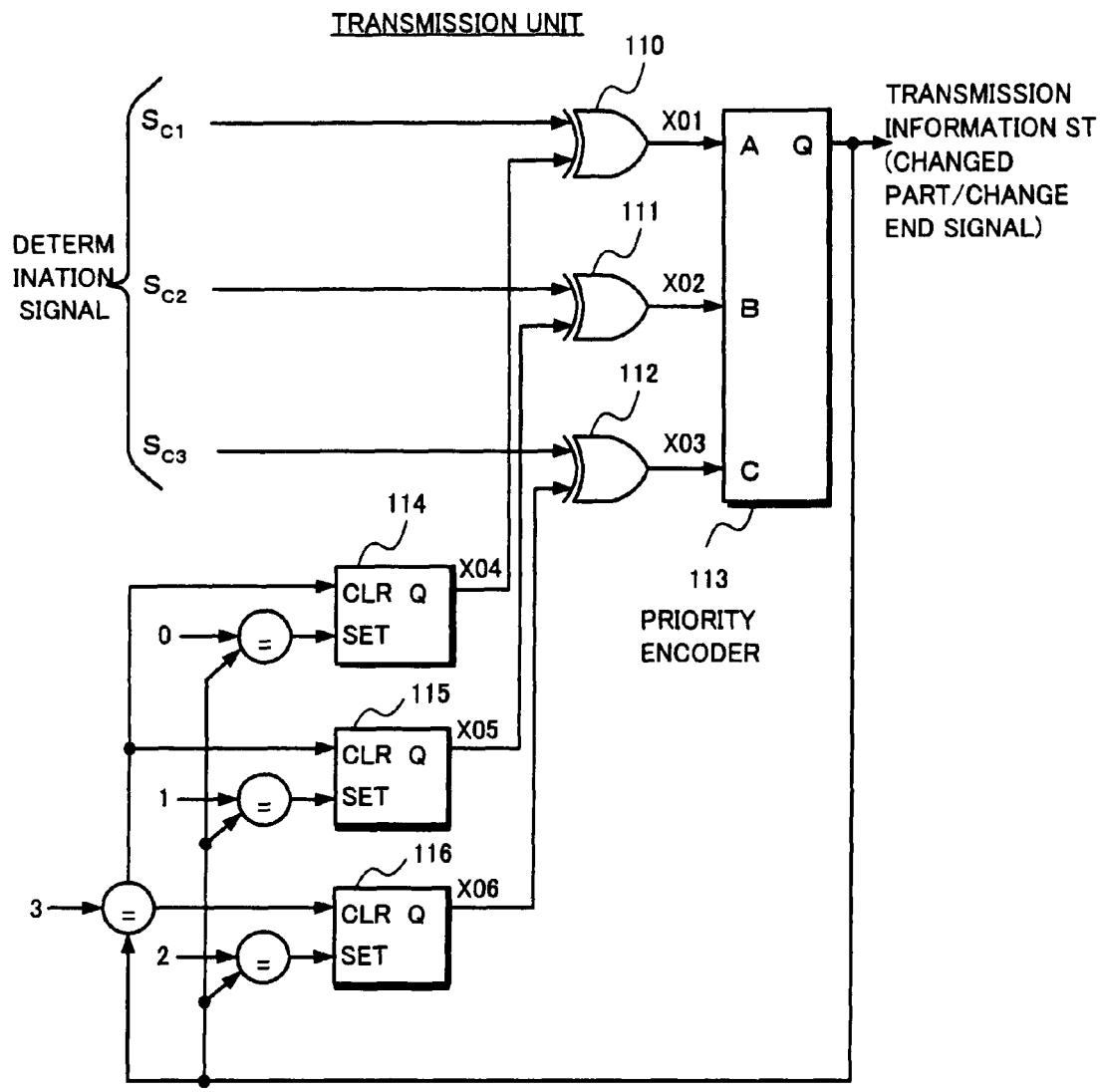
FIGS. 3A and 3B are diagrams showing one example of an encode table indicative of conversion between a transmission signal and transmission information in the first exemplary embodiment.

FIG. 3(A) is a block diagram showing a structure of a transmission unit in the first exemplary embodiment and (B) is a diagram showing a truth table of an encoder at the transmission unit. In the present exemplary embodiment, since it is necessary to discriminate only the three transmission signals $S_1\sim S_3$, the number of bits of the transmission information is two.

As shown in FIG. 3(A), the transmission unit 103 mainly comprises exclusive OR circuits 110~112, a priority encoder 113 and SR flip-flop circuits 114~116. The exclusive OR circuit 110 receives input of a determination signal $S_{C1}$ and an output X04 of the SR flip-flop circuit 114 to output its output X01 to an input A of the priority encoder 113. Similarly, the exclusive OR circuit 111 receives input of a determination signal $S_{C2}$ and an output X05 of the SR flip-flop circuit 115 to output its output X02 to an input B of the priority encoder 113. The exclusive OR circuit 112 receives input of a determination signal $S_{C3}$ and an output X06 of the SR flip-flop circuit 116 to output its output X03 to an input C of the priority encoder 113.

An output Q of the priority encoder 113 is fed back for comparison with values "0", "1" and "2" for discriminating which of the transmission signals $S_1$~$S_3$ has been changed and a value "3" indicative of no change. When the output Q coincides with the value "0", the set input of the SR flip-flop circuit 114 attains "1", so that the output X04 of the SR flip-flop circuit 114 attains "1" in the subsequent clock change. When the output Q coincides with the value "1", the set input of the SR flip-flop circuit 115 attains "1", so that the output X05 of the SR flip-flop circuit 115 attains "1" in the subsequent clock change. When the output Q coincides with the value "2", the set input of the SR flip-flop circuit 116 attains "1", so that the output X06 of the SR flip-flop circuit 116 attains "1" in the subsequent clock change. When the output Q coincides with the value "3", a reset input CLR of the SR flip-flop circuits 114, 115 and 116 attains "1", so that the outputs X04, X05 and X06 attain "0" in the subsequent clock change.

The priority encoder 113 has such a truth table as shown in FIG. 3(B) and changes the output Q, that is, the transmission information $S_T$, according to the values of the X01~X03. In the present exemplary embodiment, since the three transmission signals $S_1$~$S_3$ are discriminated by using two bits as described above, the value "3" ("11" in binary bit representation) is yet to be assigned. To the value "3", the signal $S_E$ indicative of no change or change end is assigned. The change end signal $S_E$ provides timing for changing the circuit operation clock $CLK_C$ by the clock generation unit 30 as will be described later.

The reception unit 203 comprises a decoder corresponding to the priority encoder 113, which is allowed to know which signal has been changed according to the values "0", "1" and "2" of the received changed part signal $S_L$.

2. 3) Operation

Figure 4:
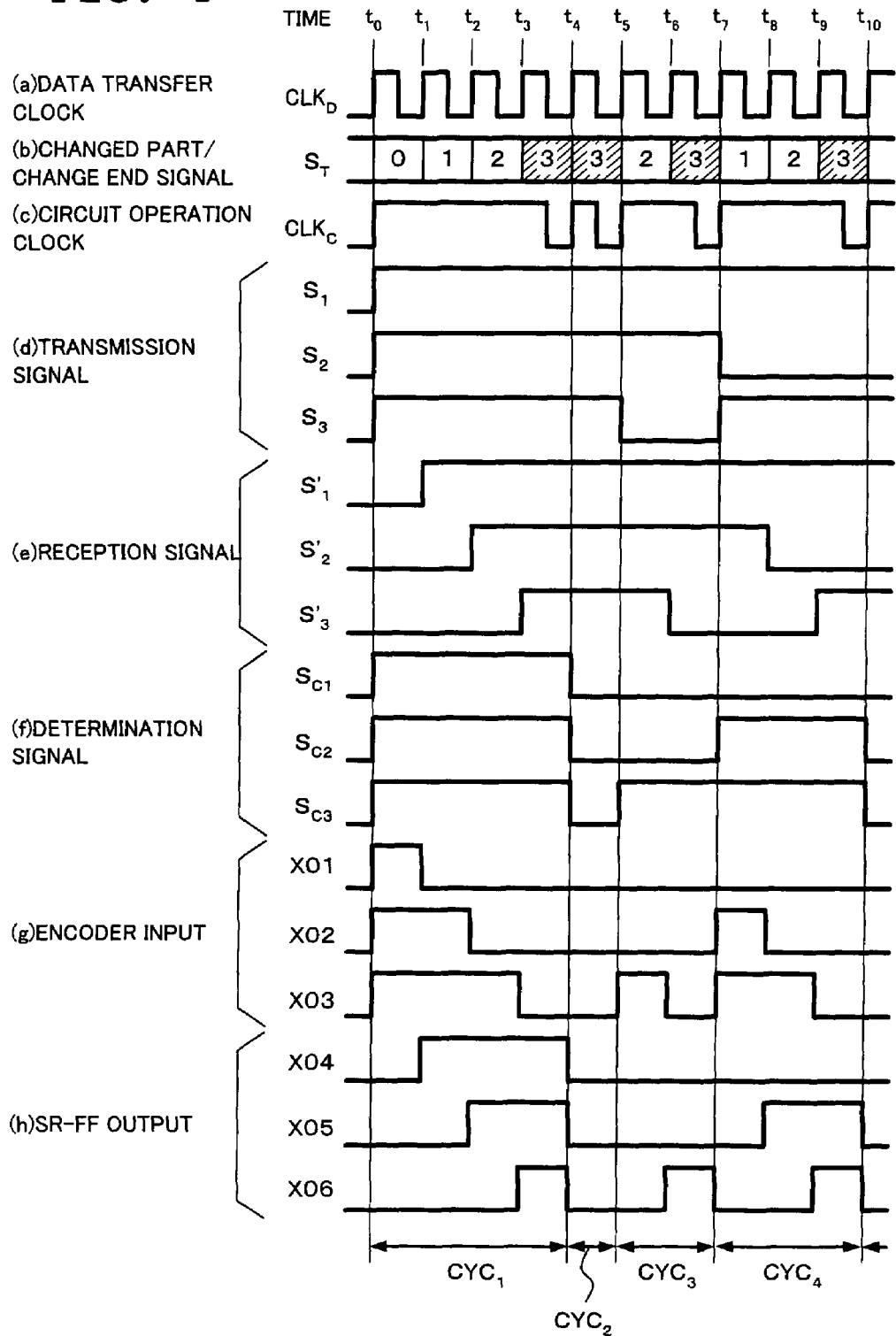
FIG. 4 is a timing chart for use in explaining operation of the signal transmission device according to the first exemplary embodiment.

FIG. 4 is a timing chart for use in explaining operation of the signal transmission device according to the first exemplary embodiment of the present invention. a) of FIG. 4 represents the data transfer clock $CLK_D$, b) the transmission information $S_T$ formed of the changed part signal $S_L$ and the change end signal $S_E$, C) the circuit operation clock $CLK_C$, d) the transmission signals $S_1$~$S_3$, e) the reception signals $S_1'$~$S_3'$, f) the determination signals $S_{C1}$~$S_{C3}$, g) the signals X01~X03 as input of the priority encoder and h) waveforms of the outputs X04~X06 of the SR flip-flop circuit, respectively.

Assume here as follows for the description. Assume that at time $t_0$, the transmission signals $S_1$~$S_3$ rise from "0" to "1", thereafter, the transmission signal $S_1$ remains unchanged, the transmission signal $S_2$ falls at time $t_7$ from "1" to "0", and the transmission signal $S_3$ falls at time $t_5$ from "1" to "0" and then again rises from "0" to "1" at time $t_7$. Also assume that at time $t_0$, the flip-flop circuits $DFF_{T1}$~$DFF_{T3}$ on the transmission side and the flip-flop circuits $DFF_{R1}$~$DFF_{R3}$ on the reception side are all set at "0".

At time $t_0$, the clock generation unit 30 raises the circuit operation clock $CLK_C$ to start a first operation cycle $CYC_1$. As a result, all the transmission signals $S_1$~$S_3$ rise from "0" to "1" and since "0" is set at the flip-flop circuits $DFF_{T1}$—$DFF_{T3}$, the determination signals $S_{C1}$~$S_{C3}$ of the exclusive OR circuits $C_1$~$C_3$ all attain "1". As a result, the outputs X01~X03 of the exclusive OR circuits 110~112 rise to bring the input X01 of the encoder 113 to "1", so that the output Q, that is, the value of the changed part signal $S_L$, attains "0". When Q=0, because the set input of the SR flip-flop circuit 114 attains "1", the output X04 of the SR flip-flop circuit 114 rises by the clock change at subsequent time $t_1$. As a result, the output X01 of the exclusive OR circuit 110 rises from "1" to "0".

Hereafter, by the same operation, the priority encoder 113 of the transmission unit 103 generates a sequence of a value "0", a value "1" and a value "2" as the changed part signal $S_L$ and when all the change is completed, generates a value "3" as the change end signal $S_E$. Thus, the transmission unit 103 transmits the sequence of the values "0", "1", "2" and "3" to the device 20 according to the data transfer clock $CLK_D$.

In the reception side device 20, upon receiving the value "0" as the changed part signal $S_L$, the reception unit 203 recognizes that it is a change notification of the signal $S_1$ and brings the inversion signal $S_{R1}$ to be active to invert the value of the flip-flop circuit $DFF_{R1}$ from "0" to "1". As a result, the reception signal $S_1'$ rises from "0" to "1" at time $t_1$. Similarly, at time $t_2$, the reception signal $S_2'$ rises from "0" to "1" and at time $t_3$, the reception signal $S_3'$ rises from "0" to "1".

The clock generation unit 30 causes the circuit operation clock $CLK_C$ to fall between time $t_3$ and time $t_4$ in which time period the value "3" is detected as the change end signal $S_E$ and again raises the circuit operation clock $CLK_C$ in synchronization with the data transfer clock $CLK_D$ at time $t_4$. Thus, operation of the first operation cycle $CYC_1$ ends.

When the circuit operation clock $CLK_C$ rises in synchronization with the data transfer clock $CLK_D$ at time $t_4$, operation of a second operation cycle $CYC_2$ starts. At this time, however, since none of the values of the transmission signals $S_1$~$S_3$ is changed, only the value "3" as the change end signal $S_E$ is output as the transmission information. Accordingly, the clock generation unit 30 causes the circuit operation clock $CLK_C$ to fall between time $t_4$ and $t_5$ in which time period the value "3" is detected as the change end signal $S_E$ and again raises the circuit operation clock $CLK_C$ at time $t_5$ in synchronization with the data transfer clock $CLK_D$. Thus, operation of the second operation cycle $CYC_2$ ends.

When the circuit operation clock $CLK_C$ rises at time $t_5$ in synchronization with the data transfer clock $CLK_D$, operation of a third operation cycle $CYC_3$ starts. As a result, only the transmission signal $S_3$ falls from "1" to "0" and since at that time point, "1" is stored in all the D flip-flop circuits $DFF_{T1}$~$DFF_{T3}$, the determination signals $S_{C1}$~$S_{C3}$ of the exclusive OR circuits $C_1$~$C_3$ attain (0, 0, 1). The transmission unit 103 accordingly generates the value "2" as the changed part signal $S_L$ and since there remains no signal to be changed, generates the value "3" as the change end signal $S_E$. As a result, the transmission unit 103 transmits a sequence of the value "2" and the value "3" according to the data transfer clock $CLK_D$ as shown in FIG. 4(b).

Upon receiving the value "2" as the changed part signal $S_L$, the reception unit 203 on the reception side recognizes that it is a change notification of the signal $S_3$ and brings the inversion signal $S_{R3}$ to be active to invert the value of the flip-flop circuit $DFF_{R3}$ from "1" to "0". As a result, the reception signal $S_3'$ falls from "1" to "0" at time $t_6$. Since the values of other reception signals $S_1'$ and $S_2'$ have no change, they remain unchanged.

The clock generation unit 30 causes the circuit operation clock $CLK_C$ to fall between time $t_6$ and time $t_7$ in which time period the value "3" is detected as the change end signal $S_E$ and again raises the circuit operation clock $CLK_C$ in synchronization with the data transfer clock $CLK_D$ at time $t_7$. Thus, operation of the third operation cycle $CYC_3$ ends. Operation of a subsequent fourth operation cycle $CYC_4$ will be the same.

2. 4) Effects

As shown in FIG. 4, according to the present exemplary embodiment, the number of data transfer clocks necessary for transferring data of four cycles ($CYC_1$~$CYC_4$) will be 10 clocks totaling four, one, two and three. With related techniques, because as many clocks as four cycles are consumed, 16 clocks are required. With the present exemplary embodiment, therefore, operation approximately 1.6 times faster than that of the related techniques can be realized.

According to the computation, in a case, for example, where the device 10 and the device 20 are connected by 20 physical signal lines and the transmission circuit 101 and the reception circuit 201 transmit and receive 40 signals, the signal transmission device according to the present exemplary embodiment has a probability of high-speed transmission being 0.33 as compared with a related case where all the signals are transmitted by time-division multiplexing and in a case of transmitting and receiving 100 signals, the probability will be 0.2.

In the present exemplary embodiment, although timing of the changed part signal $S_L$ and the circuit operation clock $CLK_C$ is set as shown in FIG. 4, it is not limited thereto. Numerous modes with each timing shifted are possible. Basic operation in these modes is the same as that described above.

Second Embodiment

While in the above-described exemplary embodiment, two devices on the transmission side and the reception side are illustrated, the present invention is similarly applicable to a case where a plurality of devices are connected.

Figure 5:
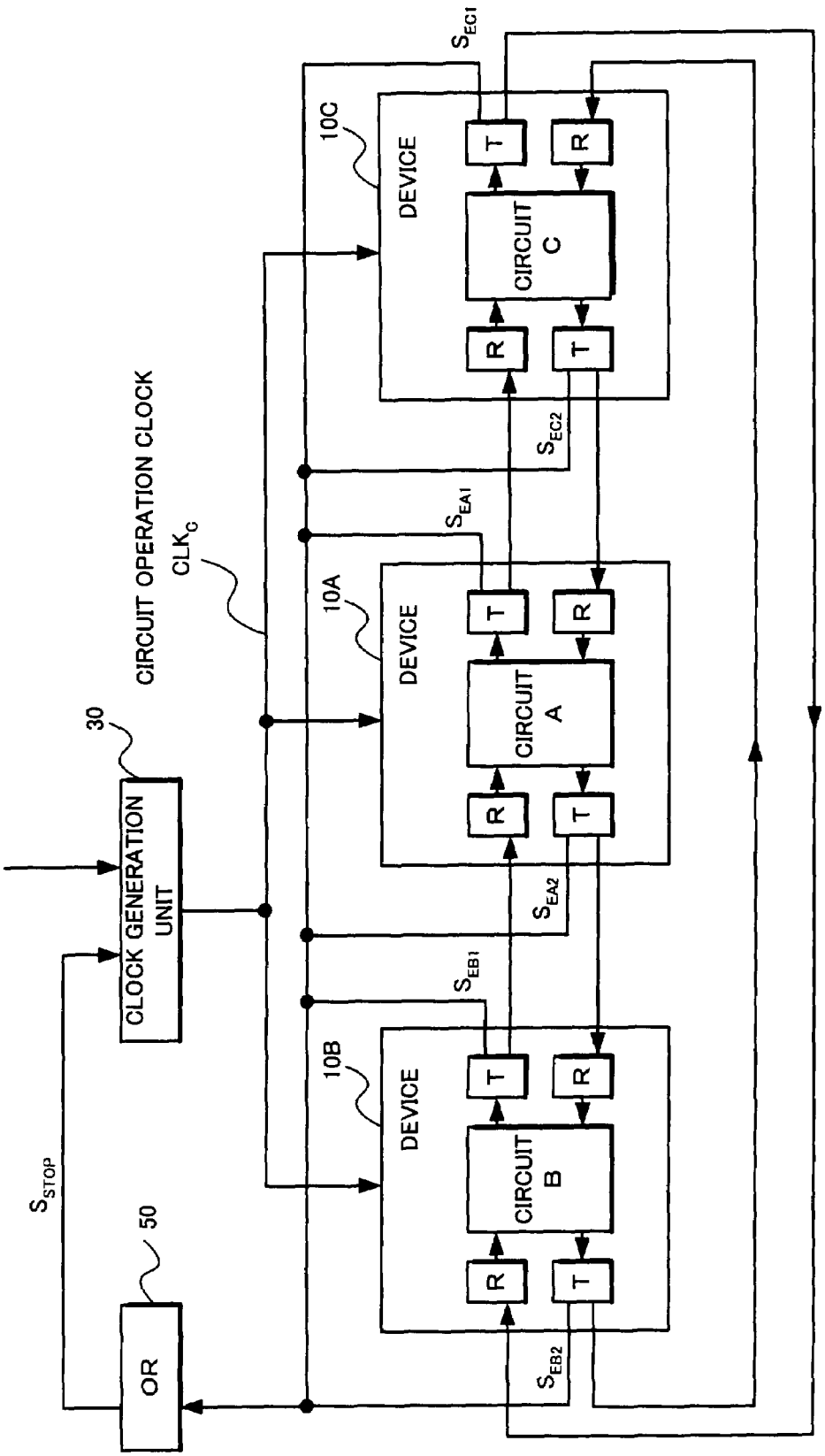
FIG. 5 is a block diagram showing a schematic structure of a signal transmission device according to a second exemplary embodiment of the present invention.

FIG. 5 is a block diagram showing a schematic structure of a signal transmission device according to a second exemplary embodiment. In the present exemplary embodiment, although a circuit with three devices 10A, 10B and 10C are connected to each other as an example, a circuit with three or more devices connected with each is also applicable.

In FIG. 5, each of the devices 10A, 10B and 10C has the same structure, in which each of circuits A, B and C for executing transmission and reception is provided with two transmission modules T for interactive transmission and two reception modules R. Since structures of the transmission module T and the reception module R are basically the same as those shown in FIG. 2, no description will be made thereof.

The difference are that the change end signal $S_E$ is drawn by other one-bit signal line than that of the changed part signal $S_L$ and that a total of six change end signals, $S_{EA1}$ and $S_{EA2}$, $S_{EB1}$ and $S_{EB2}$, and $S_{EC1}$ and $S_{EC2}$ are connected to an OR circuit 50 in the transmission module T of the present exemplary embodiment. In the present exemplary embodiment, the value of the change end signal $S_E$ attains "0" at the end of a change, which is ordinary "1". The OR circuit 50 takes a logical sum of these six change end signals to change a clock temporary stop signal $S_{STOP}$. Although the clock temporary stop signal $S_{STOP}$ is ordinarily set to be "1", when all the six change end signals $S_E$ attain "0", it attains "0" only in that period. The clock generation unit 30 passes the data transfer clock $CLK_D$ or prevents passage of the same to output a predetermined value "1" according to the clock temporary stop signal $S_{STOP}$.

Figure 6:
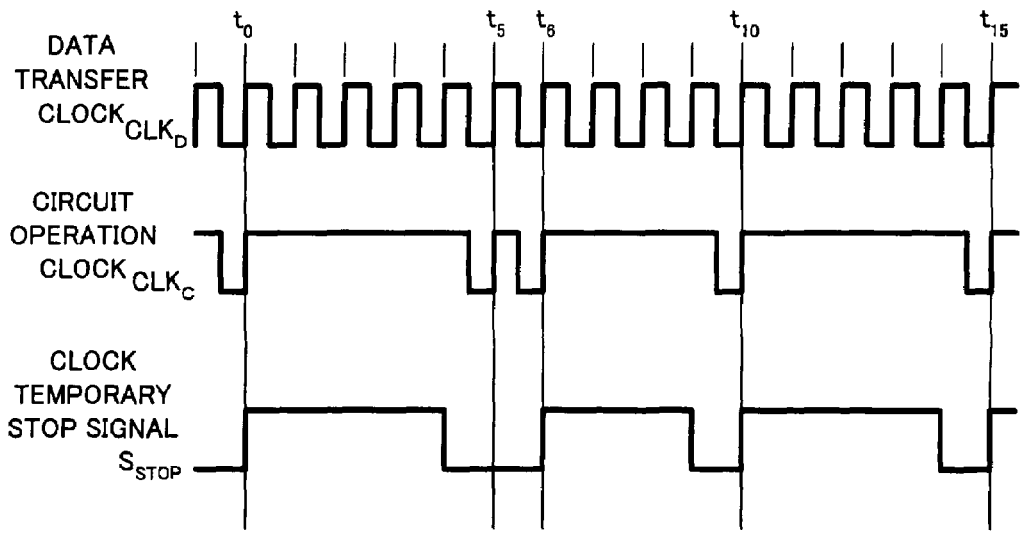
FIG. 6 is a timing chart for use in explaining operation of the signal transmission device according the second exemplary embodiment.

FIG. 6 is a timing chart for use in explaining operation of the signal transmission device according to the second exemplary embodiment. When the clock temporary stop signal $S_{STOP}$ has "0", the clock generation unit 30 outputs the same clock signal as the data transfer clock $CLK_D$ as the circuit operation clock $CLK_C$ and when the clock temporary stop signal $S_{STOP}$ has "1", outputs the fixed value "1". Accordingly, the circuit operation clock $CLK_C$ changes when all the six change end signals $S_E$ attain "0", thereby advancing the circuit operation cycle. Such operation is obtained in view of the fact that unless all the transmission modules T finish transmission, that is, unless all the change end signals $S_E$ attain "0", the circuit is not allowed to proceed to subsequent operation.

Such arrangement as described above enables the circuit operation clock $CLK_C$ to have the maximum rate similarly to the first exemplary embodiment even when the number of devices connected is not less than three.

Third Exemplary Embodiment

Figure 7:
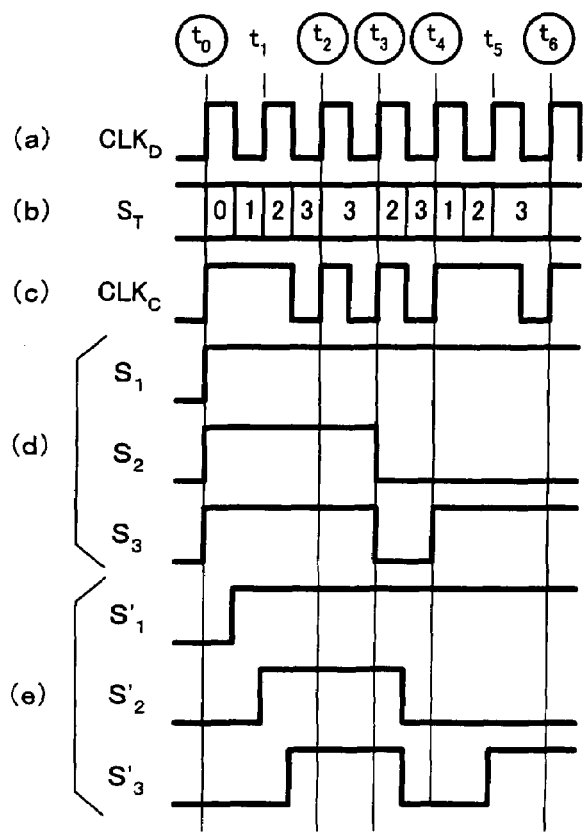
FIG. 7 is a timing chart for use in explaining operation of a signal transmission device according to a third exemplary embodiment of the present invention.

FIG. 7 is a timing chart for use in explaining operation of a signal transmission device according to a third exemplary embodiment of the present invention. FIG. 7 a) through e) show the same signal waveforms as those of FIG. 4 a) through e), with the only difference being that the transmission information $S_T$ is transferred by using opposite edges of the data transfer clock $CLK_D$. Use of the opposite edges enables each transfer time to be halved to transfer data at a higher speed.

Fourth Exemplary Embodiment

The above-described first exemplary embodiment has been described with respect to a case where the three signals $S_1$~$S_3$ are transmitted between the devices as an example. At that time, since the minimum number of bits necessary for representing the number 3 of signals in binary is two, there exists one free space in the changed part signal $S_L$ to which the change end signal $S_E$ is assigned. Although the number of signals is not limited to a specific value as has been already described, the changed part signal $S_L$ will have a plurality of values yet to be assigned depending on the number of signals. In a case where there exist such a plurality of free spaces, with one assigned to the change end signal $S_E$, the remaining free spaces can be assigned when a plurality of signal changes simultaneously occur, thereby enabling further speed-up. Specific example will be shown in the following.

Figure 8:
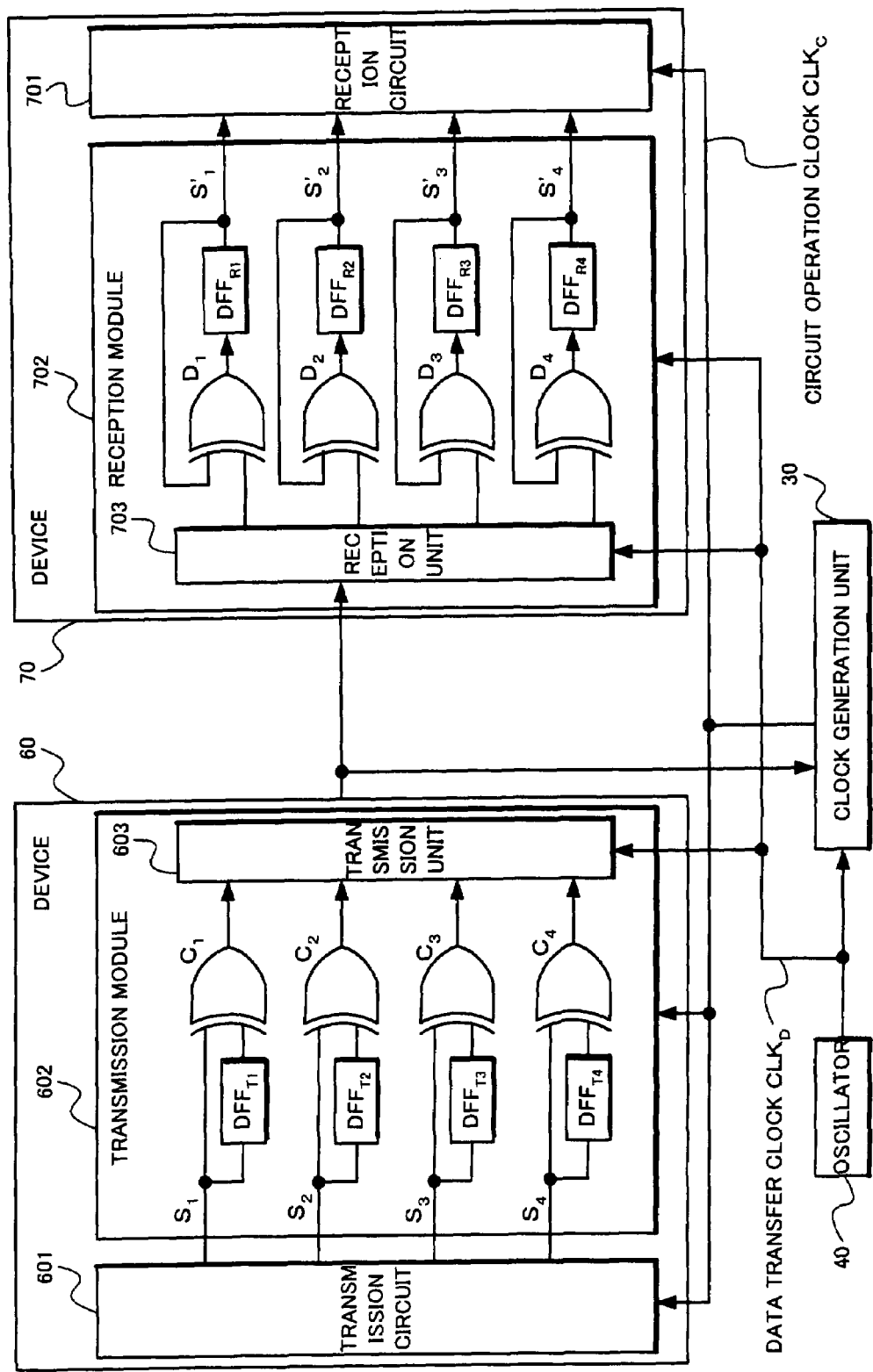
FIG. 8 is a block diagram showing a structure of a signal transmission device according to a fourth exemplary embodiment of the present invention.

FIG. 8 is a block diagram showing a structure of a signal transmission device according to a fourth exemplary embodiment of the present invention. Shown in the present exemplary embodiment is a case where four signals $S_1$~$S_4$ are transmitted from a device 60 to a device 70.

The transmission side device 60 is provided with a transmission circuit 601 and a transmission module 602. The transmission signals $S_1$~$S_4$ output from the transmission circuit 601 are converted into the transmission information $S_T$ formed of the changed part signal $S_L$ and the change end signal $S_E$ by the transmission module 602 and transmitted to the reception side device 70. The reception side device 70 is provided with a reception circuit 701 and a reception module 702, in which the reception module 702 receives the transmission information $S_T$ formed of the changed part signal $S_L$ and the change end signal $S_E$ to detect a changed signal, thereby outputting reception signals $S_1'$~$S_4'$ corresponding to the transmission signals $S_1$~$S_4$, respectively.

The transmission module 602 is provided with a transmission unit 603 comprising an encoder and the reception module 702 is provided with a reception unit 703 comprising a decoder corresponding to the transmission unit 603. Since they have basically the same structures as those described in the first exemplary embodiment, no detailed description will be made thereof. In addition, the same circuit is given the same reference numeral or reference code as that of the first exemplary embodiment.

Figure 9:
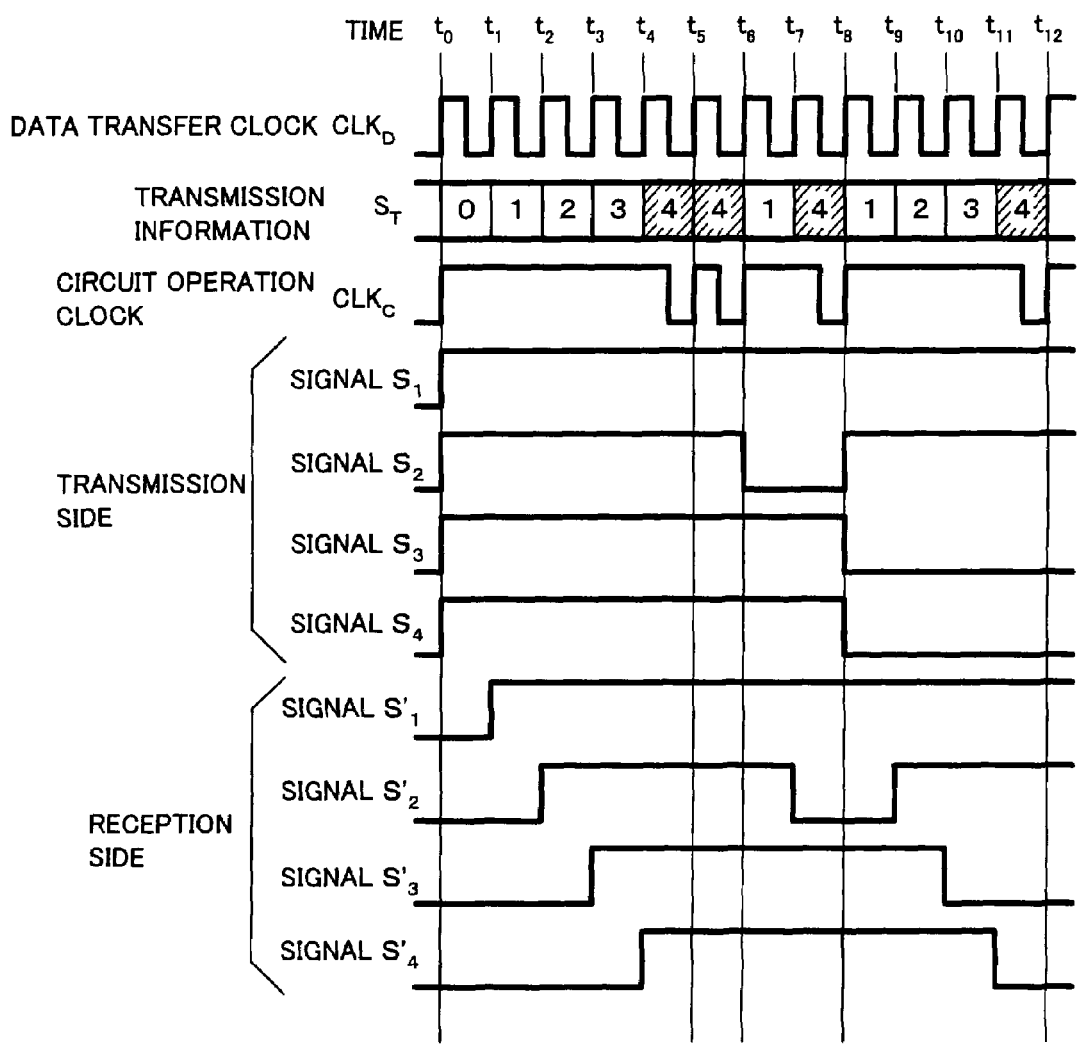
FIG. 9 is a timing chart in a case where the signal transmission device shown in FIG. 8 is operated similarly to the first exemplary embodiment.

FIG. 9 is a timing chart for a case where the signal transmission device is operated in a manner similar to that of the first exemplary embodiment (see FIG. 4). Since the number of signals is four, the transmission information $S_T$ requires three bits for discriminating five cases including the change end information. In FIG. 9, values "0", "1", "2" and "3" are assigned to the signals $S_1$, $S_2$, $S_3$ and $S_4$, respectively, and when not all the signals are changed, a value "4" is assigned.

There, however, remain values "5", "6" and "7" unused in the three-bit transmission information $S_T$, so that assigning information to these values enables transmission speed to be increased.

Figure 10:
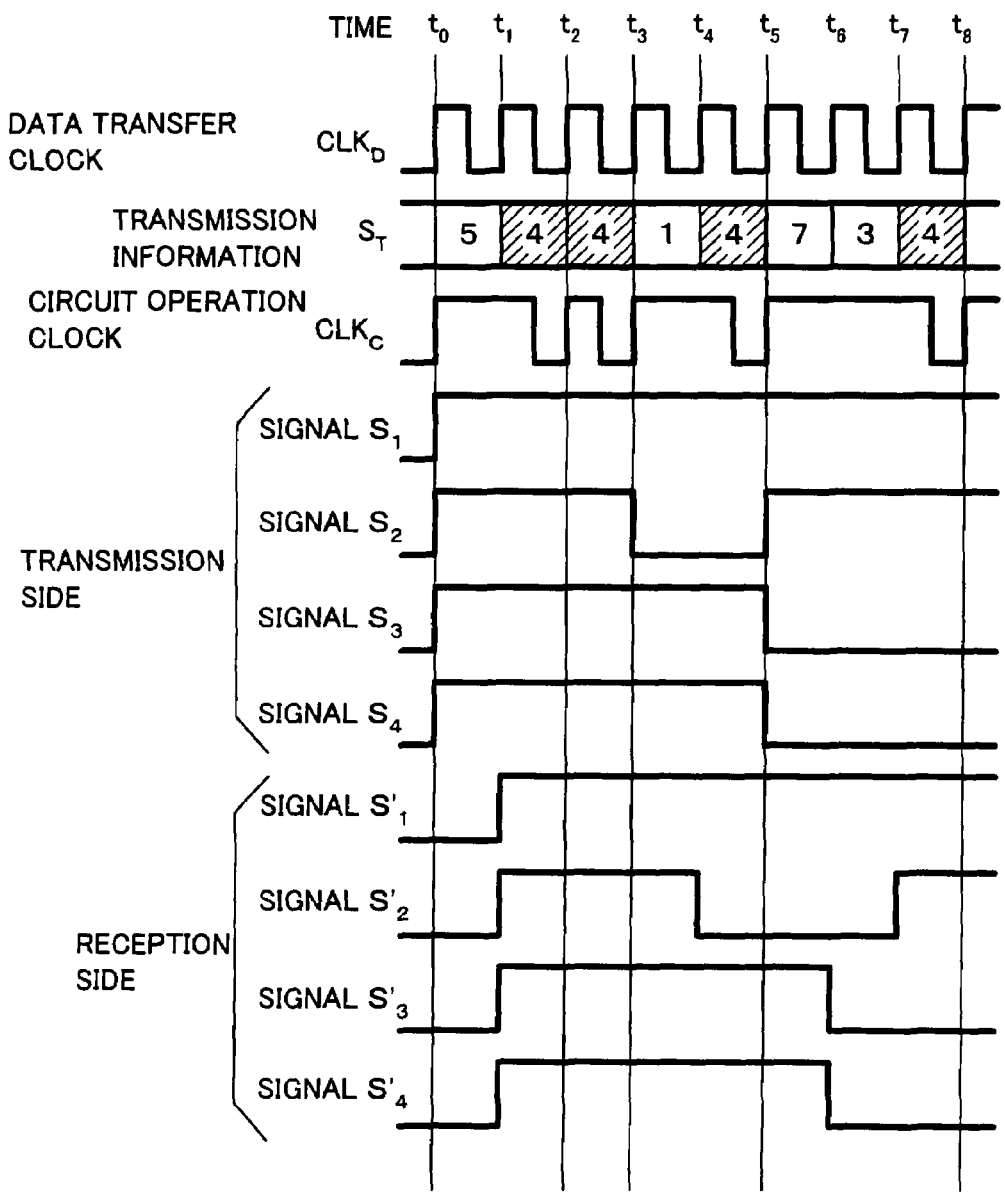
FIG. 10 is a timing chart for use in explaining operation of the signal transmission device according to the fourth exemplary embodiment.

FIG. 10 is a timing chart for use in explaining operation of the signal transmission device according to the fourth exemplary embodiment of the present invention. In the present exemplary embodiment, the value "5" of the 3-bit transmission information $S_T$ is set to have information that all the signals $S_1$, $S_2$, $S_3$ and $S_4$ are changed, the value "6" is set to have information that the signals $S_1$ and $S_2$ are changed and the value "7" is set to have information that the signals $S_3$ and $S_4$ are changed. Thus, use of a value yet to be assigned enables information transmission operation to be executed during one clock cycle from time $t_0 \sim t_1$, which operation requires a period from time $t_0 \sim t_4$, for example, in a case of FIG. 9. Thus, the present exemplary embodiment enables one and a half times faster operation than the operation example shown in FIG. 9.

To what signal change a value yet to be assigned of the transmission information $S_T$ should be assigned is not limited to that shown in the present exemplary embodiment.

Fifth Exemplary Embodiment

The present invention can be applied to a circuit operation verification device which verifies functional operation of a circuit to be verified by simulation. In particular, in a circuit operation verification device in which a circuit to be verified is divided into a plurality of partial circuits and a plurality of simulators realizing their functional operation by simulation are connected to each other, providing each simulator with the transmission module and the reception module shown in FIG. 2 or FIG. 8, for example, mitigates limitations of physical connections to enable high-speed operation verification of the circuit as described above. The same effect can be obtained even by application to a logical circuit emulator device.

According to the exemplary embodiment of the present invention, with a storage unit for holding a plurality of transmission signals transmitted last time provided on a transmission side device and a storage unit for holding a plurality of reception signals received last time provided on a reception side device, whether a transmission signal to be transmitted this time has been changed or not is checked to transmit information which discriminates a changed signal (changed part signal in the present exemplary embodiment) to the reception side device. By changing only a changed signal based on the change discrimination information among signals held in the storage unit, the device on the reception side is allowed to equivalently receive the transmission signal as of this time. The present invention accordingly enables high-speed data transfer by effectively using a physical signal line even when the number of signals is larger than the number of physical connection pins.

In addition, by making change discrimination information have a minimum number of bits necessary for representing a number N of signals in binary, transmission of an arbitrary signal is enabled, while a value yet to be assigned which remains depending on the number of signals can be used for assignment to change end information or to discriminate a plurality of changed signals.

Also, according to the exemplary embodiment of the present invention, high-speed transmission of a plurality of signals is enabled between a plurality of circuits operating according to given operation timing. More specifically, with a transmission side storage unit for holding values of a plurality of signals transmitted at one-preceding operation timing provided on the transmission side and a reception side storage unit for holding values of a plurality of signals received at the same one-preceding operation timing provided on the reception side, determination is made whether each value of a plurality of signals transmitted at the current operation timing has been changed or not. Transmission information including first information for discriminating a changed signal and second information indicative of the end of change discrimination at the current operation timing is generated based on the determination result and transmitted. Upon reception of the first information at the reception side, a changed signal among a plurality of signals is discriminated by using the information and a value corresponding to the changed signal which is held in the reception side storage unit is changed and output to a reception side circuit as a reception signal of the current operation timing. Furthermore, reception of the second information by the timing control unit (a clock generation unit in the present embodiment) controls operation timing.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INCORPORATION BY REFERENCE

This application is based upon and claims the benefit of priority from Japanese patent application No. 2005-158268, filed on May 31, 2005, the disclosure of which is incorporated herein in its entirety by reference.

INDUSTRIAL APPLICABILITY

The present invention is applicable to a system in general for transferring data between devices and, for example, applicable for use in transmitting and receiving data between a plurality of devices in a logical circuit emulator device, a logical circuit operation verification device and the like.

The invention claimed is:

1. A signal transmission device for transmitting a plurality of signals between a plurality of circuits operable according to given operation timing through a plurality of connection units which transmit digital data represented in binary, comprising:

a transmission side storage unit connected to a transmission side circuit for holding each value of said plurality of signals transmitted at one-preceding operation timing, a reception side storage unit connected to a reception side circuit for holding each value of said plurality of signals received at said one-preceding operation timing, a determination unit for determining whether each value of said plurality of signals transmitted from said transmission side circuit at current operation timing is changed from a value held in said transmission side storage unit, a transmission unit for generating transmission information including first information represented in binary for discriminating a changed signal and second information represented in binary indicative of the end of change discrimination at current operation timing based on a determination result of said determination unit and transmitting the generated information to said plurality of connection units, a reception unit for receiving input of said first information through said plurality of connection units to discriminate a changed signal among said plurality of signals, a change unit for changing a value corresponding to said changed signal which is held in said reception side storage unit to output the obtained value as a reception signal of current operation timing to said reception side circuit, and a timing control unit for receiving said second information to control said operation timing, wherein said timing control unit changes the number of cycles for a subsequent operation cycle upon said second information every time a change ends.

2. The signal transmission device according to claim 1, wherein said timing control unit gives subsequent operation timing to said plurality of circuits at every reception of said second information.

3. The signal transmission device according to claim 1, wherein said timing control unit gives-subsequent operation timing to said plurality of circuits only when receiving said second information from all said transmission units of the plurality of transmission side circuits.

4. The signal transmission device according to claim 1, wherein said plurality of signals are a number N of signals (N is an integer not less than 2), said plurality of connection units are formed of a number M of physical connection units (M is an integer not less than 1) and N>M.

5. The signal transmission device according to claim 4, wherein said first information has a minimum number of bits necessary for representing said number N of signals in binary.

6. The signal transmission device according to claim 1, wherein said transmission unit transmits said first information with said second information multiplexed.

7. The signal transmission device according to claim 1, wherein said first information discriminates a plurality of changed signals.

8. A circuit operation verification device having the signal transmission device according to claim 1, wherein said plurality of circuits are a plurality of partial circuits obtained by dividing a circuit to be verified, and which comprises a plurality of simulation units for realizing functional operation of said plurality of partial circuits by simulation, the simulation unit on the transmission side being provided with said transmission side storage unit, said determination unit and said transmission unit, and the simulation unit on the reception side being provided with said reception side storage unit, said reception unit and said change unit.

9. A circuit operation verification device having the signal transmission device according to claim 2, wherein said plurality of circuits are a plurality of partial circuits obtained by dividing a circuit to be verified, and which comprises a plurality of simulation units for realizing functional operation of said plurality of partial circuits by simulation, the simulation unit on the transmission side being provided with said transmission side storage unit, said determination unit and said transmission unit, and the simulation unit on the reception side being provided with said reception side storage unit, said reception unit and said change unit.

10. A circuit operation verification device having the signal transmission device according to claim 3, wherein said plurality of circuits area plurality of partial circuits obtained by dividing a circuit to be verified, and which comprises a plurality of simulation units for realizing functional operation of said plurality of partial circuits by simulation, the simulation unit on the transmission side being provided with said transmission side storage unit, said determination unit and said transmission unit, and the simulation unit on the reception side being provided with said reception side storage unit, said reception unit and said change unit.

11. A signal transmission method of transmitting a plurality of signals between a plurality of circuits operable according to given operation timing through a plurality of connection units which transmit digital data represented in binary, comprising:

holding each value of said plurality of signals transmitted at one-preceding operation timing on the transmission side and the reception side, determining whether each value of said plurality of signals transmitted at current operation timing is changed from a value held on said transmission side, generating transmission information including first information represented in binary for discriminating a changed signal and second information represented in binary indicative of end of change discrimination at current operation timing based on said determination result, transmitting said transmission information to the reception side, discriminating a changed signal among said plurality of signals based on said first information received through said plurality of connection units, changing, with respect to said changed signal, a corresponding value which is held on said reception side to receive the obtained signal as a reception signal of current operation timing, and receiving said second information to change said operation timing and apply the obtained timing to said plurality of circuits, wherein at the change of said operation timing, changing the number of cycles for a subsequent operation cycle upon said second information every time a change ends.

12. The signal transmission method according to claim 11, wherein at the change of said operation timing, subsequent operation timing is given to said plurality of circuits at every reception of said second information.

13. The signal transmission method according to claim 11, wherein at the change of said operation timing, subsequent operation timing is given to said plurality of circuits only when receiving said second information from all said transmission units of the plurality of transmission side circuits.

14. The signal transmission method according to claim 11, wherein said plurality of signals are a number N of signals (N is an integer not less than 2), said plurality of connection units are: formed of a number M of physical connection units (M is an integer not less than 1) and N>M.

15. The signal transmission method according to claim 14, wherein said first information has a minimum number of bits necessary for representing said number N of signals in binary.

16. The signal transmission method according to claim 11, wherein at the transmission of said transmission information to the reception side, said first information is transmitted with said second information multiplexed.

17. The signal transmission method according to claim 11, wherein said first information discriminates a plurality of changed signals.

18. A circuit operation verification method including the signal transmission method according to claim 11, wherein
said plurality of circuits are a plurality of partial circuits obtained by dividing a circuit to be verified, functional operation of said plurality of partial circuits is realized by simulation by a simulation unit,
a transmission side simulation unit realizes the step of holding values of said plurality of signals on the transmission side, the step of determining a change of a value of said plurality of signals, and the step of transmitting said transmission information, and
a reception side simulation unit realizes the step of holding values of said plurality of signals on the reception side and the step of changing a corresponding value held on said reception side.

* * * * *